Patented July 30, 1940

2,209,903

UNITED STATES PATENT OFFICE 2,209,903

PHENOLKETONE-FORMALDEHYDE RESINOUS CONDENSATION PRODUCT

Anderson W. Ralston, Robert J. Vander Wal, and Stewart T. Bauer, Chicago, Ill., assignors to Armour and Company, Chicago, Ill., a corporation of Illinois No Drawing. Application June 1, 1938, Serial No. 211,270

9 Claims. (Cl. 260—53)

This invention pertains to plastic compositions and processes of producing the same and it comprises as new compositions of matter plastics prepared by the condensation of formaldehyde or its polymers or homologues with aryl-alkyl ketones of the general formula

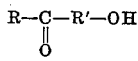

where R is an aliphatic hydrocarbon radical containing at least eleven carbon atoms and R' is a phenylene radical or alkyl substituted phenylene radical.

One of the most important types of synthetic resins prepared commercially is that resulting from the condensation of formaldehyde and its polymers with phenol. Such resins have long enjoyed commercial prominence. As the field of use for synthetic resins has broadened there has developed a demand for plastics possessing particular properties. This demand has resulted in the discovery of a large number of new plastic compositions, and in the modification of the already existing types by the incorporation of various plasticizing agents and other modifiers into the resin formula. For certain uses it is highly desirable that the plastic compositions possess some degree of flexibility. It is also advantageous for the plastic compositions to possess high electrical resistance and resistance to change during prolonged exposure to atmospheric conditions. A resin suitable for insulating copper wire should possess all of the above named properties.

We have discovered a new class of synthetic resins which can be made by condensing hydroxy aryl-alkyl ketones with formaldehyde or its homologues or polymers. The products we obtain are transparent plastics possessing a high degree of flexibility and high insulating and dielectric properties. The ketones we use can be prepared by reacting phenol or alkylated phenols, such as cresol, with fatty acid chlorides by a modification of the Friedel-Crafts reaction known as the Fries rearrangement. In this reaction the acid chloride first reacts with the hydroxyl group of the phenol to give an ester and this ester then rearranges in the presence of metallic halides to give ketones. The type reaction is as follows; R being an alkyl radical having at least eleven carbon atoms.

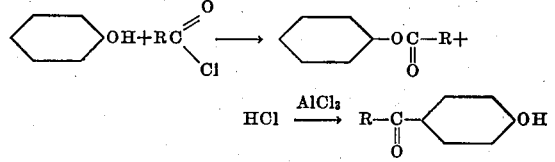

As stated, we have discovered that these ketones can be condensed with formaldehyde, its polymers or homologues, to give a series of resins possessing commercially valuable properties. We have condensed such ketones as hydroxyphenylheptadecyl ketone, hydroxyphenylheptadecenyl ketone, hydroxyphenylundecyl ketone, methyl hydroxyphenylheptadecyl ketone with formaldehyde, hexamethylenetetramine, or meta or para formaldehyde and have obtained transparent plastics which can be molded to give flexible resinous compositions of high insulating and dielectric properties. Every ketone we use will contain at least eleven carbon atoms in the alkyl, but while we prefer to use hexamethylenetetramine as the source of formaldehyde, we can use formaldehyde itself or its solid polymers.

We shall now give examples of how our resins can be prepared.

Example 1

We first prepare an hydroxyphenylalkyl ketone, for example, hydroxyphenylheptadecyl ketone. This ketone is readily made by the modified Friedel-Crafts synthesis from phenol and stearyl chloride. Thus, 20 parts by weight of phenol are dissolved in about 50 parts by weight of chlorobenzene and the mixture placed in a three-necked flask equipped with a water cooled condenser, stirrer and hopper tube for admitting aluminum chloride. The mixture is cooled to 10° C. by means of an ice bath and 26 parts by weight of aluminum chloride are then added. The ice bath is then removed and 30 parts by weight of stearyl chloride added over a period of one hour. During the addition of the stearyl chloride the temperature rises to 50° C. When the addition of the stearyl chloride is completed the reaction mixture is heated to 80–90° C. for three and one-half hours with constant stirring. The reaction product is then hydrolyzed by pouring over ice and the aqueous mixture subjected to steam distillation to remove the chlorobenzene. The final Friedel-Crafts reaction product, hydroxyphenyl-heptadecyl ketone is then removed from the hot aqueous mixture as an oily layer solidifying on cooling. The crude ketone is dissolved in ether and the ether solution washed with a dilute aqueous solution of an alkali such as sodium carbonate to free the ketone of any stearic acid which might be present as an impurity. The ketone is then crystallized from ether.

Thus the method by which we make the ketones used in our invention is a conventional Friedel-Crafts synthesis.

We then react the ketone with formaldehyde in accordance with the general technique used for making phenol-formaldehyde resins. As the formaldehyde source it is more convenient to use hexamethylenetetramine. Three and a half parts by weight of the ketone are heated at 185° C. for twenty minutes with 0.25 part by weight of hexamethylenetetramine. The resulting product is an initial condensation product. When this initial or "first stage" resin is heated at 200° C. under 2,000 pounds pressure the resulting final condensation product is a soft transparent plastic which is markedly flexible.

Alternatively we can react the ketone and hexamethylenetetramine in the presence of phenol to give an initial condensation product which can be ground to powder and used as a powdered molding composition. Fillers can be incorporated therewith prior to molding. Thus we heat 2.85 parts of phenol, 0.72 part of hydroxyphenylheptadecyl ketone and 0.75 part of hexamethylenetetramine at 180° C. for twenty minutes. The plastic solid formed can be ground to a powder and articles molded therefrom under heat and pressure.

Example 2

Twenty parts of phenol are dissolved in about 50 parts by weight of chlorobenzene. The solution is placed in a three-necked flask and 26 parts of aluminum chloride then added. To this is then added slowly over a period of one hour 30 parts by weight of oleyl chloride. The hydrolysis and recovery of the ketone is conducted as shown in Example 1. The product, hydroxyphenylheptadecenyl ketone, is a light reddish viscous liquid. This ketone is then condensed with hexamethylenetetramine by the following procedure; 3.5 parts of the hydroxyphenylheptadecenyl ketone and 0.25 part of hexamethylenetetramine are mixed and heated at 180° C. for fifteen minutes. The product is a transparent plastic soluble in organic solvents and possessing the appearance and flexibility of rubber. Upon further heating its solubility in organic solvents is materially reduced but it does not lose its transparency or flexibility.

Example 3

Hydroxyphenylundecyl ketone is prepared by the action of lauryl chloride upon phenol in the presence of aluminum chloride as described above. The pure ketone obtained melts at 47–48° C. It is then condensed with hexamethylenetetramine by heating 2.5 parts of the ketone with 0.25 part of hexamethylenetetramine for twenty-five minutes at 150° C. This results in a transparent plastic composition which is then ground to a powder and heated to 180° C. under 1,000 pounds per square inch pressure. The product is a transparent plastic possessing high dielectric properties and is somewhat flexible.

Example 4

Twenty-two parts of cresol are reacted with stearyl chloride in the presence of aluminum chloride as described under Example 1. The ketone obtained melts, after purification, at 54–55° C. and can be reacted with hexamethylenetetramine to give an initial condensation product which is then further condensed under heat and pressure to a transparent plastic.

Example 5

Twenty parts of phenol are reacted with 30 parts of the acid chlorides obtained from the fatty acids of linseed oil in the presence of aluminum chloride using tetrachloroethane as the solvent. These acid chlorides are obtained from the fatty acids of linseed oil by reacting them with thionyl chloride. The acid chlorides are distilled before use and are "water white" in appearance. The resulting ketonic mixture is a viscous liquid which is then condensed with hexamethylenetetramine to give a plastic solid as described above. The initial condensation product (prior to condensation to the final stage) is a viscous liquid having marked drying properties.

Example 6

Twenty-two parts of cresol are reacted with stearyl chloride in the presence of aluminum chloride as described under Example 1. The product melts, after purification, at 54–55° C. and is then condensed with formalin containing 1% of aqueous ammonia at 80–90° C. The water is then distilled and the resulting product further treated by heat and pressure to produce a transparent plastic.

We can start with any hydroxy aryl ketone prepared from a higher fatty acid chloride or mixtures of higher fatty acid chlorides. Generally we start with hydroxy phenyl or alkyl substituted hydroxy phenyl ketones prepared from fatty acid chlorides of twelve or more carbon atoms since these acid chlorides can be prepared from fatty acids which are available and cheap. Our invention is, therefore, not limited to any specific example described above since we are the first to describe plastic compositions prepared from phenolic ketones and formaldehyde itself or formaldehyde-liberating compounds.

These plastics herein described have physical properties differing from resins previously prepared. We wish to clearly distinguish our plastics from those prepared by the addition of fatty acids or fats as modifying agents. In the resins above described the ketones are an integral part of the plastic composition and cannot be considered as plasticizing or modifying agents.

And in the appended claims we mean "a formaldehyde" to embrace formaldehyde-yielding materials such as meta and para formaldehyde and hexamethylenetetramine.

Having thus described our invention, what we claim is:

1. A resinous condensation product from a formaldehyde and an aryl-alkyl ketone having the structure

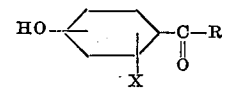

where R is an aliphatic hydrocarbon radical containing eleven or more carbon atoms and X is chosen from the group consisting of hydrogen and a methyl radical.

2. A resinous condensation product from a formaldehyde and a mixture of aryl-alkyl ketones having the structure

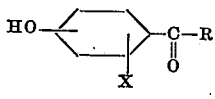

where R is an aliphatic hydrocarbon radical containing eleven or more carbon atoms and X is chosen from the group consisting of hydrogen and a methyl radical.

3. The resinous condensation product as in claim 1 wherein R is heptadecyl.

4. The resinous condensation product as in claim 1 wherein R is undecyl.

5. The resinous condensation product as in claim 1 wherein R is heptadecenyl.

6. The process which comprises reacting a formaldehyde with a hydroxyphenyl-alkyl ketone in which the alkyl radical contains at least eleven carbon atoms.

7. The process which comprises reacting a formaldehyde with a hydroxyphenylheptadecyl ketone.

8. The process which comprises reacting a formaldehyde with a hydroxyphenylheptadecenyl ketone.

9. The process which comprises reacting a formaldehyde with a hydroxyphenylundecyl ketone.

ANDERSON W. RALSTON.
ROBERT J. VANDER WAL.
STEWART T. BAUER.